(12) United States Patent
Schwager et al.

(10) Patent No.: US 11,347,272 B2
(45) Date of Patent: May 31, 2022

(54) DISPLAY CHASSIS DESIGN FOR NARROW BORDER PORTABLE INFORMATION HANDLING SYSTEM

(71) Applicant: Dell Products L.P., Round Rock, TX (US)

(72) Inventors: Mark Andrew Schwager, Cedar Park, TX (US); Yu-Feng Huang, Hsin-Chu (TW); Kai-Yuan Cheng, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/084,677

(22) Filed: Oct. 30, 2020

(65) Prior Publication Data

US 2022/0137668 A1  May 5, 2022

(51) Int. Cl.
*G06F 1/16* (2006.01)

(52) U.S. Cl.
CPC .......... *G06F 1/1654* (2013.01); *G06F 1/1616* (2013.01); *G06F 1/1607* (2013.01); *G06F 1/1656* (2013.01)

(58) Field of Classification Search
CPC ..... G06F 1/1654; G06F 1/1681; G06F 1/1683
See application file for complete search history.

(56) References Cited

U.S. PATENT DOCUMENTS

| | | | | |
|---|---|---|---|---|
| 4,972,457 A * | 11/1990 | O'Sullivan | ........... | G06F 1/1616 455/418 |
| 5,729,431 A * | 3/1998 | Marwah | ................ | G06F 1/1601 257/713 |
| 9,935,357 B2 * | 4/2018 | Bologna | ............... | H01Q 1/2291 |
| 11,009,918 B2 * | 5/2021 | Oakeson | ............... | G06F 1/1669 |
| 11,132,030 B2 * | 9/2021 | Huang | ................. | H05K 5/0204 |
| 2021/0034115 A1 * | 2/2021 | Pichumani | ............ | G06F 1/1656 |
| 2021/0089080 A1 * | 3/2021 | Huang | ................. | G06F 1/1656 |

* cited by examiner

*Primary Examiner* — Adrian S Wilson
(74) *Attorney, Agent, or Firm* — Terrile, Cannatti & Chambers; Stephen A. Terrile (57) ABSTRACT

A portable information handing system. The portable information handling system includes a base chassis, the base chassis comprising a motherboard, the motherboard comprising a processor and a bus coupled to the processor; and, a display chassis, the display chassis comprising the display chassis comprising a display component and a rear display cover portion, the rear display cover portion comprising a display component attachment assembly, the display component attachment assembly attaching the display component to the rear display cover portion, the display component attachment assembly comprising a display chassis disassembly component, the display chassis disassembly component being actuatable to remove the display component from the display chassis.

12 Claims, 9 Drawing Sheets

DISPLAY CHASSIS DESIGN FOR NARROW BORDER PORTABLE INFORMATION HANDLING SYSTEM

BACKGROUND OF THE INVENTION

Field of the Invention

The present invention relates to information handling systems. More specifically, embodiments of the invention relate to a display chassis design in a portable information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a portable information handing system, comprising: a base chassis portion, the base chassis portion comprising a motherboard; a display chassis portion, the display chassis portion comprising a display component and a rear display cover portion, the rear display cover portion comprising a display component attachment assembly, the display component attachment assembly attaching the display component to the rear display cover portion, the display component attachment assembly comprising a display chassis disassembly component, the display chassis disassembly component being actuatable to remove the display component from the display chassis portion.

In another embodiment the invention relates to an information handling system comprising: a base chassis, the base chassis comprising a motherboard, the motherboard comprising a processor and a bus coupled to the processor; and, a display chassis, the display chassis comprising a display component and a rear display cover portion, the rear display cover portion comprising a display component attachment assembly, the display component attachment assembly attaching the display component to the rear display cover portion, the display component attachment assembly comprising a display chassis disassembly component, the display chassis disassembly component being actuatable to remove the display component from the display chassis.

In another embodiment the invention relates to a method for disassembling a display chassis, comprising: removing a cable cover to provide access to a disassembly component; actuating the disassembly component, a display component being attached to the rear display cover via an attachment assembly, actuation of the disassembly component releasing adhesion of the display component to a rear display cover; and, removing the display component from the display chassis by pulling the display component away from a hinge assembly of the display chassis.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Various aspects of the disclosure include an appreciation that a display chassis which is assembled by inserting a first edge of a display component along an edge of a rear display cover of a display chassis and then adhering the display component to the rear display cover can present challenges when it becomes necessary to remove the display component after the display chassis is assembled.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
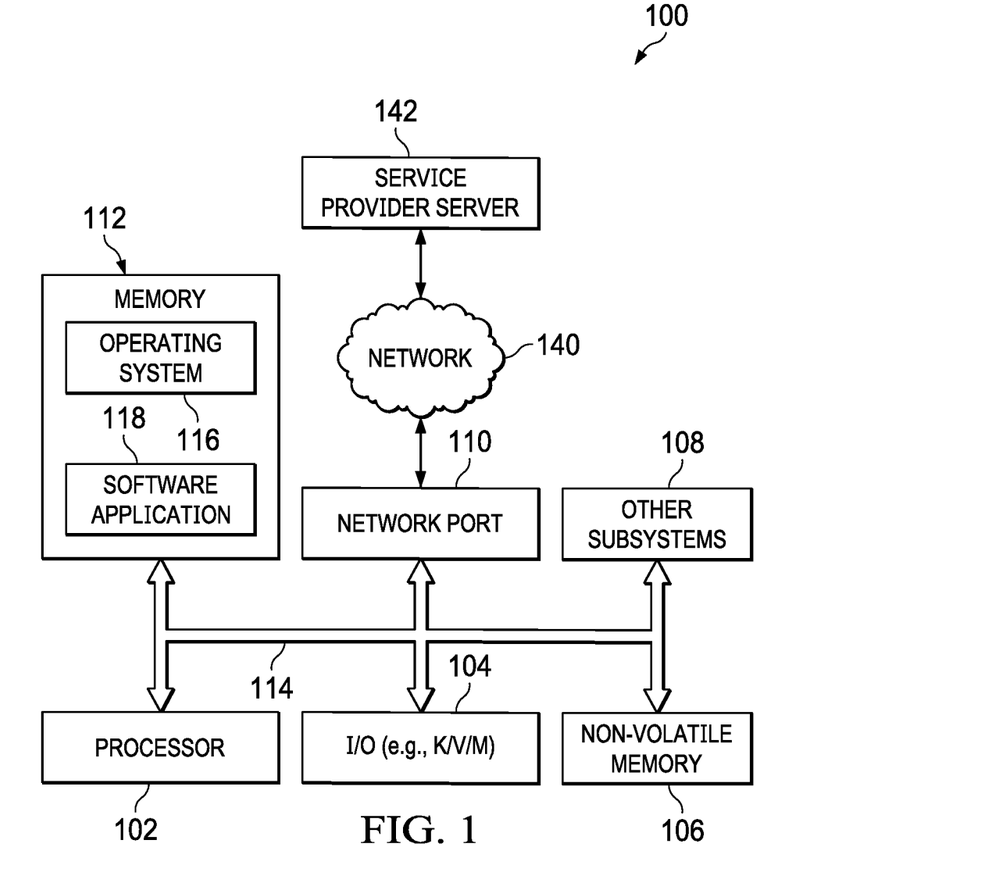
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise at least one software application 118. In one embodiment, the information handling system 100 is able to download the software application from the service provider server 142. In another embodiment, the software application 118 is provided as a service from the service provider server 142.

Figure 2:
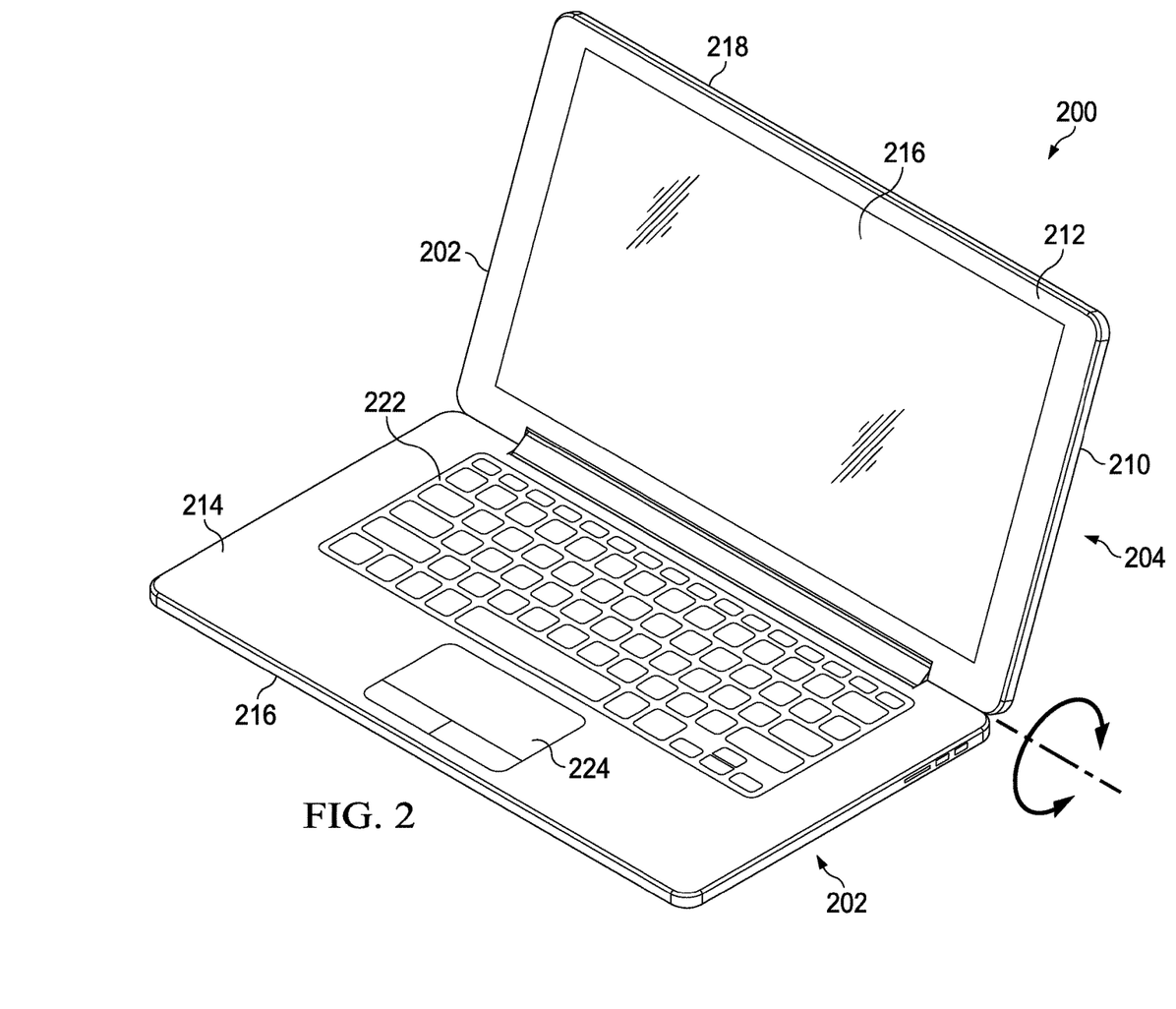
FIG. 2 shows a perspective view of an example portable information handling system.

FIG. 2 shows a perspective view of an example portable information handling system chassis 200 such as a tablet type portable information handling system, a laptop type portable information handling system, or any other mobile information handling system. It will be appreciated that some or all of the components of the information handling system 100 may be included within information handling system chassis 200. The portable information handling system 200 chassis includes a base chassis 202 and a display chassis 204 shown in an open configuration. It will be appreciated that a closed configuration would have the display chassis 204 fully closed onto the base chassis 202.

The base chassis 202 or the display chassis 204 of the information handling system 200 may comprise an outer metal case or shell. The information handling system 200 may include a plurality of chassis portions. In various embodiments, the information handling system 200 may include some or all of an A-Cover 210, a B-Cover 212, a C-cover 214 and a D-Cover 216. In various embodiments, the A-Cover 210 and the B-Cover 212 provide the display chassis 204. In various embodiments, the C-Cover 214 and the D-Cover 216 provide the base chassis 202.

In various embodiments, the A-cover 210 encloses a portion of the display chassis 204 of the information handling system 200. In various embodiments, the B-cover 212 encloses another portion of the display chassis 204 of the information handling system 200. In various embodiments, the B-Cover may include a display screen 216 and a bezel 218 around the display screen.

In various embodiments, the C-cover 214 encloses a portion of the base chassis 202 of the information handling system 200. In various embodiments, the C-cover 214 may include, for example, a keyboard 222, a trackpad 224, or other input/output (I/O) device. In various embodiments, certain components of the information handling system such as a mother board are mounted within the C-Cover 214. In various embodiments, the D-cover 216 encloses another portion of the base chassis 202 of the information handling system 200.

When placed in the closed configuration, the A-cover 202 forms a top outer protective shell, or a portion of a lid, for the information handling system 200, while the D-cover 204 forms a bottom outer protective shell, or a portion of a base, for the information handling system. When in the fully closed configuration, the A-cover 202 and the D-cover 204 would be substantially parallel to one another.

In some embodiments, both the A-cover 202 and the D-cover 204 may be comprised entirely of metal. In some embodiments, the A-cover 202 and D-cover 204 may include both metallic and plastic components. For example, plastic components that are radio-frequency (RF) transparent may be used to form a portion of the C-cover 208.

In various embodiments, the A-cover 202 may be movably connected to a back edge of the C-cover 204 via one or more hinges. In this configuration, the hinges allow the A-cover 202 to rotate from and to the C-cover 204 allowing for multiple orientations of the information handling system 200. In various embodiments, the information handling system may include a sensor to detect the orientation of the information handling system and activate or deactivate any number of antenna systems based on the occurrence of any specific orientation. In some embodiments, the information handling system may be a laptop with limited rotation of the A-cover 204 with regard to the C-cover 204, for example up to 180° rotation arc. In other embodiments the information handling system 200 may be a convertible information handling system with full rotation to a tablet configuration. It will be appreciated that in other embodiments, the A-Cover could attach to the C-Cover or the D-Cover.

Figure 3:
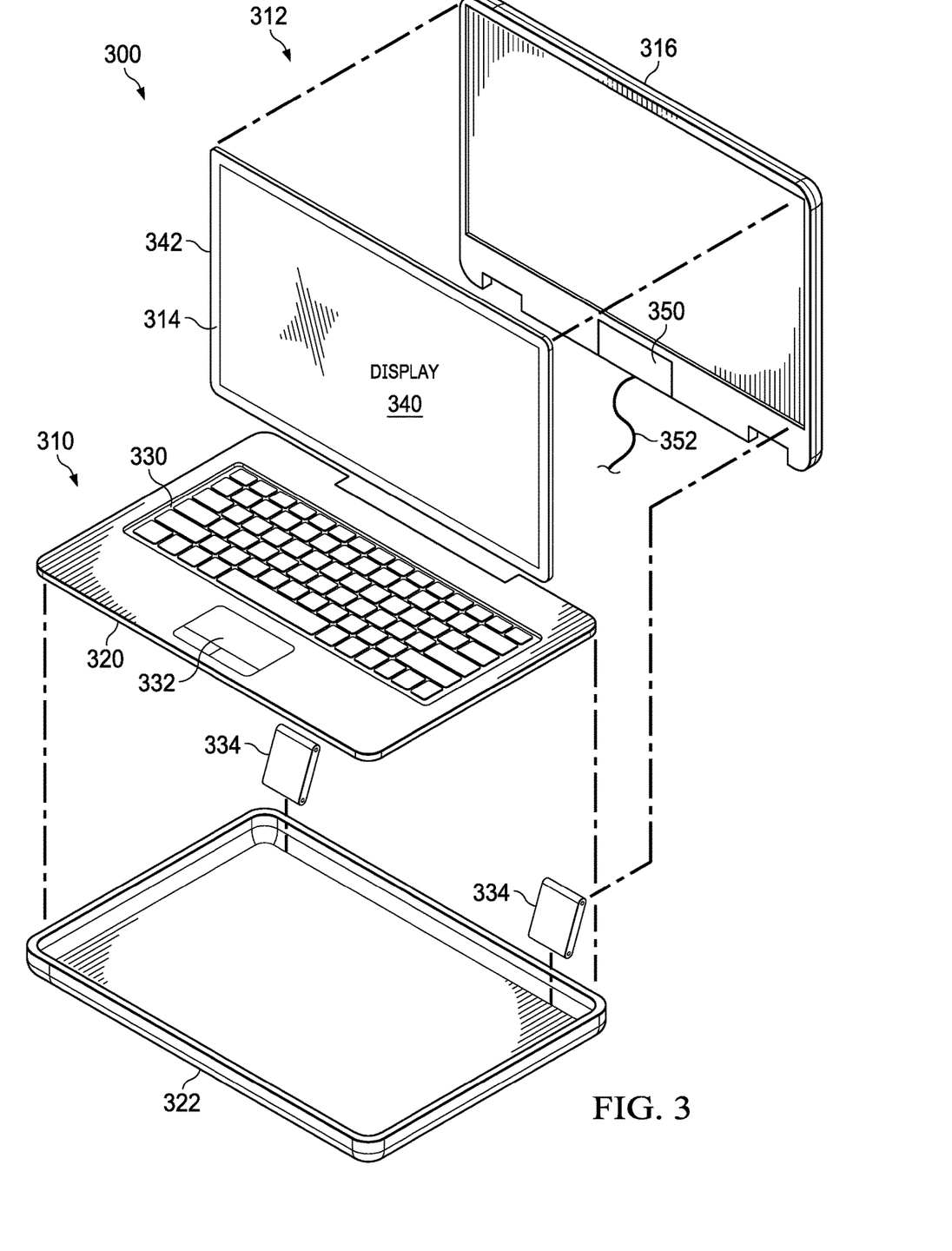
FIG. 3 shows a blown-up view of a portable information handling system.

FIG. 3 shows a blown-up view of a portable information handling system 300 having rotationally-coupled housing portions. In the example embodiment, a main housing portion 310 (which corresponds to a base chassis 202) rotationally couples to a lid housing portion 312 (which corresponds to a display chassis 204) to support various configurations to interact with an end user. Main housing portion 310 may hold one or more components of the portable information handling system, including but not limited to processor 102, system bus 114, memory subsystem 112, I/O subsystem 104 and network interface 110 discussed with respect to FIG. 1. Main housing portion 310 includes a top cover portion 320 (which includes the C-Cover 214) and a bottom cover portion 322 (which includes the D-Cover 216). Lid housing portion 312 includes a display cover portion 314 (which includes the B-Cover 210) and a rear display cover portion 316 (which includes the A-Cover 212). The top cover portion 320 may include an integrated keyboard 330 or other I/O devices, such as a trackpad 332 or microphone (not shown).

Lid housing portion 312 is rotationally coupled to main housing portion 310 via at least one hinge assembly 334. Lid housing portion 212 includes display 340 that visually presents information to the user as well as a bezel 342. Display 340 may be a touch panel with circuitry enabling touch functionality in conjunction with a display. In some embodiments, display 340 may be an "infinity edge" or "narrow bezel" display that approaches one or more the edges of lid housing portion 212 such that bezel may be narrow in size (e. g., less than 10 millimeters) on the edges. For example, display 340 is an infinity display with narrow bezels on the top and sides of lid housing portion 212 in the embodiment shown in FIG. 3. In certain embodiments, the side bezel is less than 4 mm (+/−10%) and the top bezel is less than 6 mm (+/−10%).

Lid housing portion 212 may also include timing controller (TCON) 350. Hinge assembly 330 may include cable 352 for communicably coupling one or more components within main housing portion 310 to one or more components within lid housing portion 312. For example, cable 352 may provide communication of graphics information from an I/O subsystem to TCON 350 for generation of visual images for display on display 340. Although a single cable 352 is shown, portable information handling system 300 may include one or more additional cables 352 for communicating components disposed in main housing portion 310 and lid housing portion 312. Placement of cable 352 may be selected based on design considerations, materials or manufacturing cost, material reliability, antenna placement, as well as any other considerations.

Hinge assembly 334 allows main housing portion 310 and lid housing portion 312 to rotate between a plurality of positions. For example, when portable information handling system 300 is not in use, lid housing portion 312 may be closed over the top of main portion 310 such that display 340 and keyboard 330 are protected from unintended use or damage. Rotation of lid housing portion 312 by approximately 90 degrees from main housing portion 310 brings display 340 in a raised "clamshell" position relative to keyboard 330 so that an end user can make inputs to keyboard 330 or touch panel portion of display 340 while viewing display 340. In some embodiments, clamshell position may represent lid housing portion 212 open between approximately 1 and 180 degrees from main housing portion 310. Rotation of lid housing portion 312 between approximately 180 and 359 degrees from main housing portion 310 may place portable information handling system 300 in "tablet stand" and/or "tent" positions. In tablet stand and tent positions, the user may make inputs via touch panel portion of display 340 while viewing display 340. A full 360 degree rotation of main housing portion 310 relative to lid housing portion 312 provides a tablet configuration having display 340 exposed to accept touch inputs. In any position, user inputs may be communicated to an I/O subsystem or a processor of the portable information handling system 300 for processing, and then updated information may be communicated back via cable 352 to display 340 for displaying to the user. Hinge assembly 334 may be comprised of one or more discrete hinges or a unified assembly of hinges.

Figure 4:
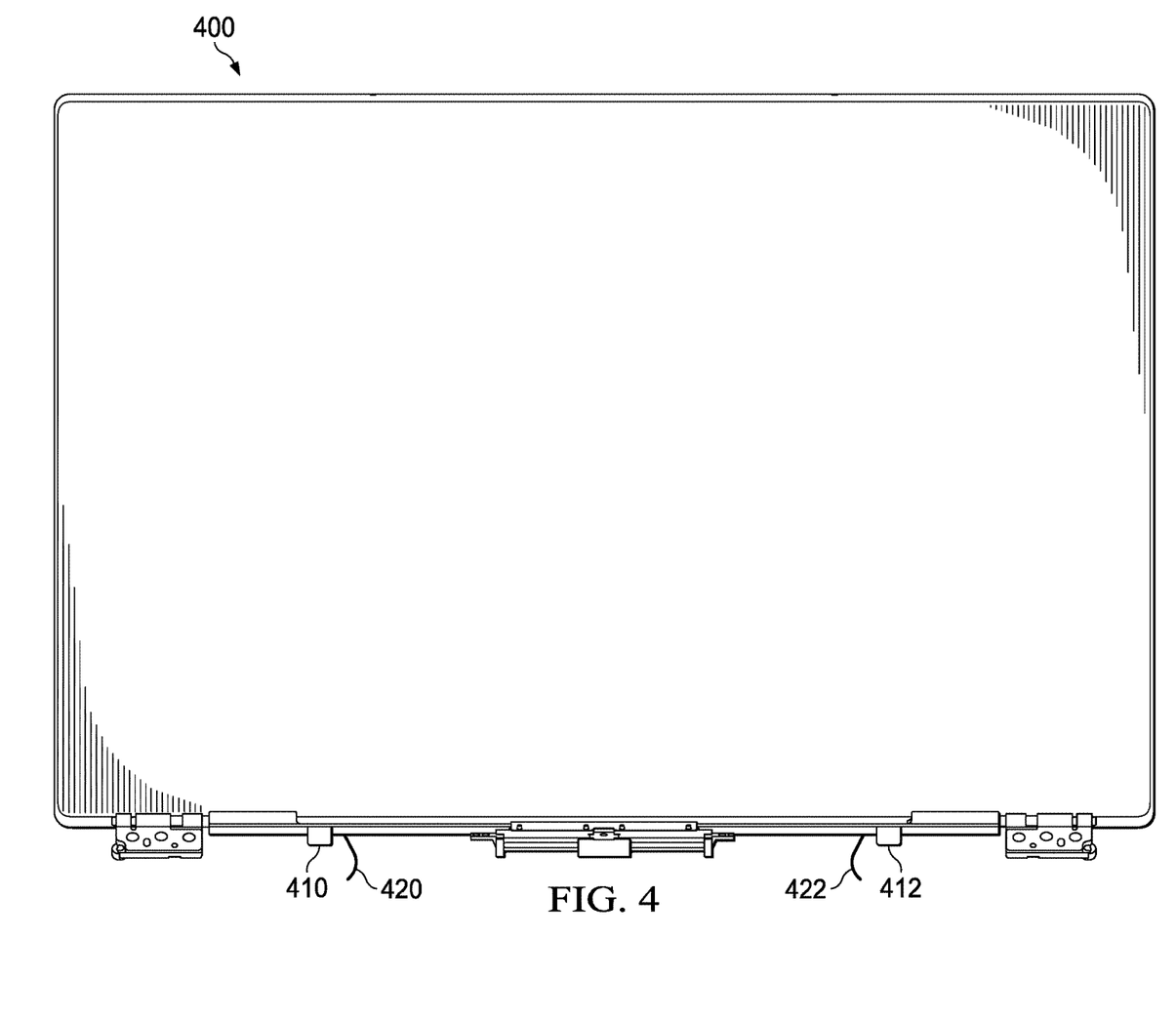
FIG. 4 shows a top view of a display chassis of a portable information handling system.
Figure 5:
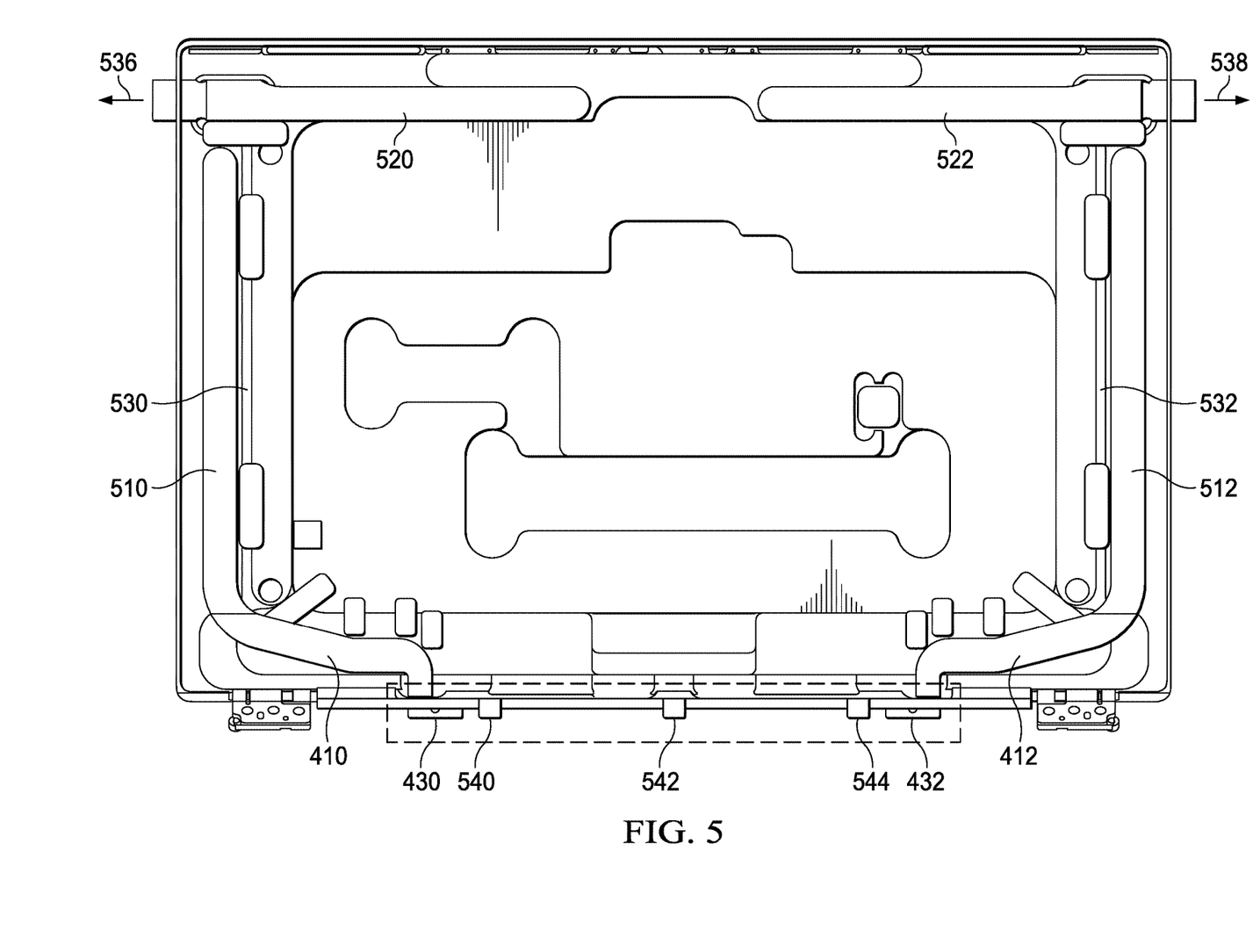
FIG. 5 shows a cutaway top view of a display chassis of a portable information handling system.
Figure 6:
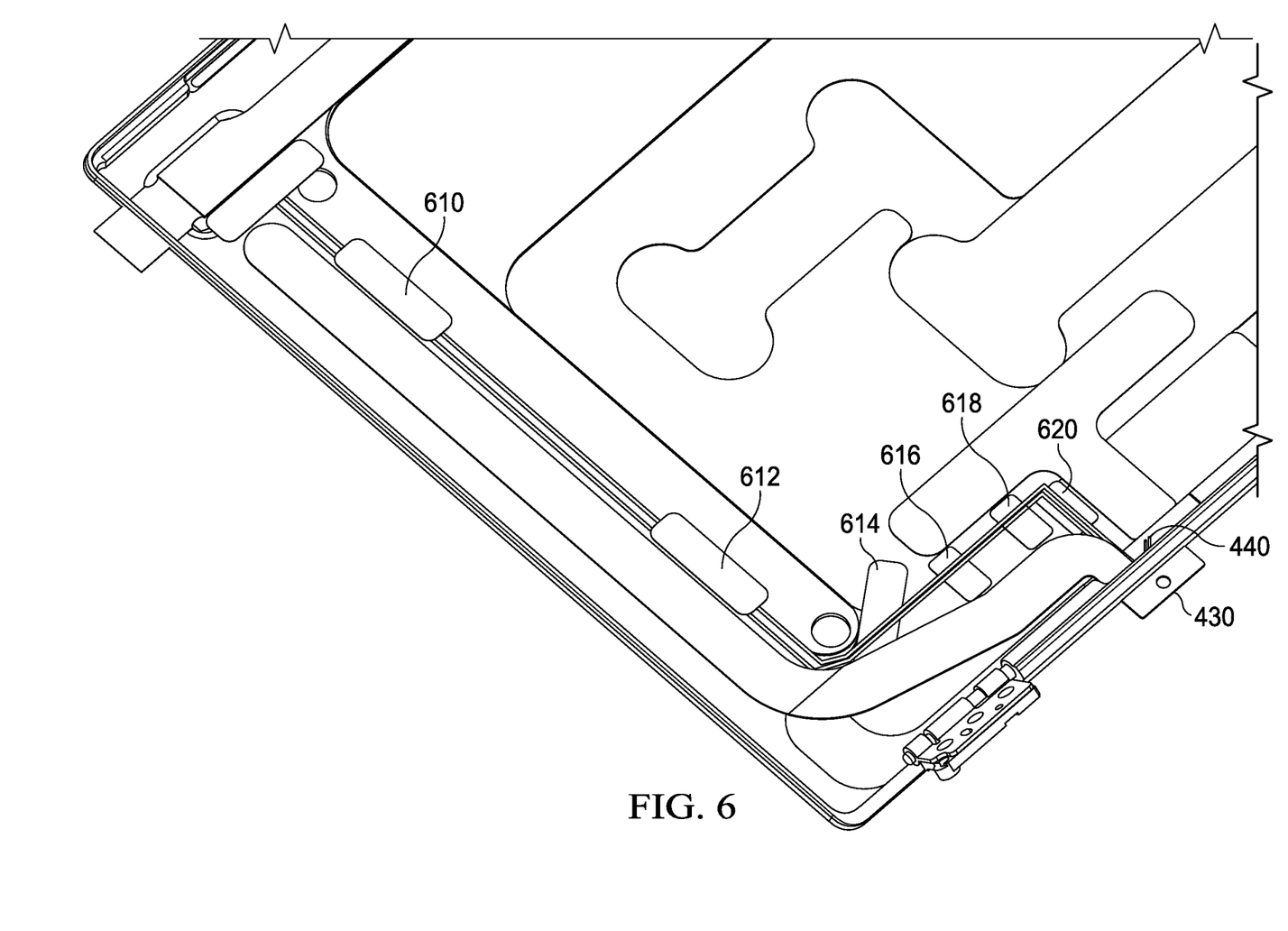
FIG. 6 shows a cutaway perspective view of a portion of a display chassis of a portable information handling system.
Figure 7:
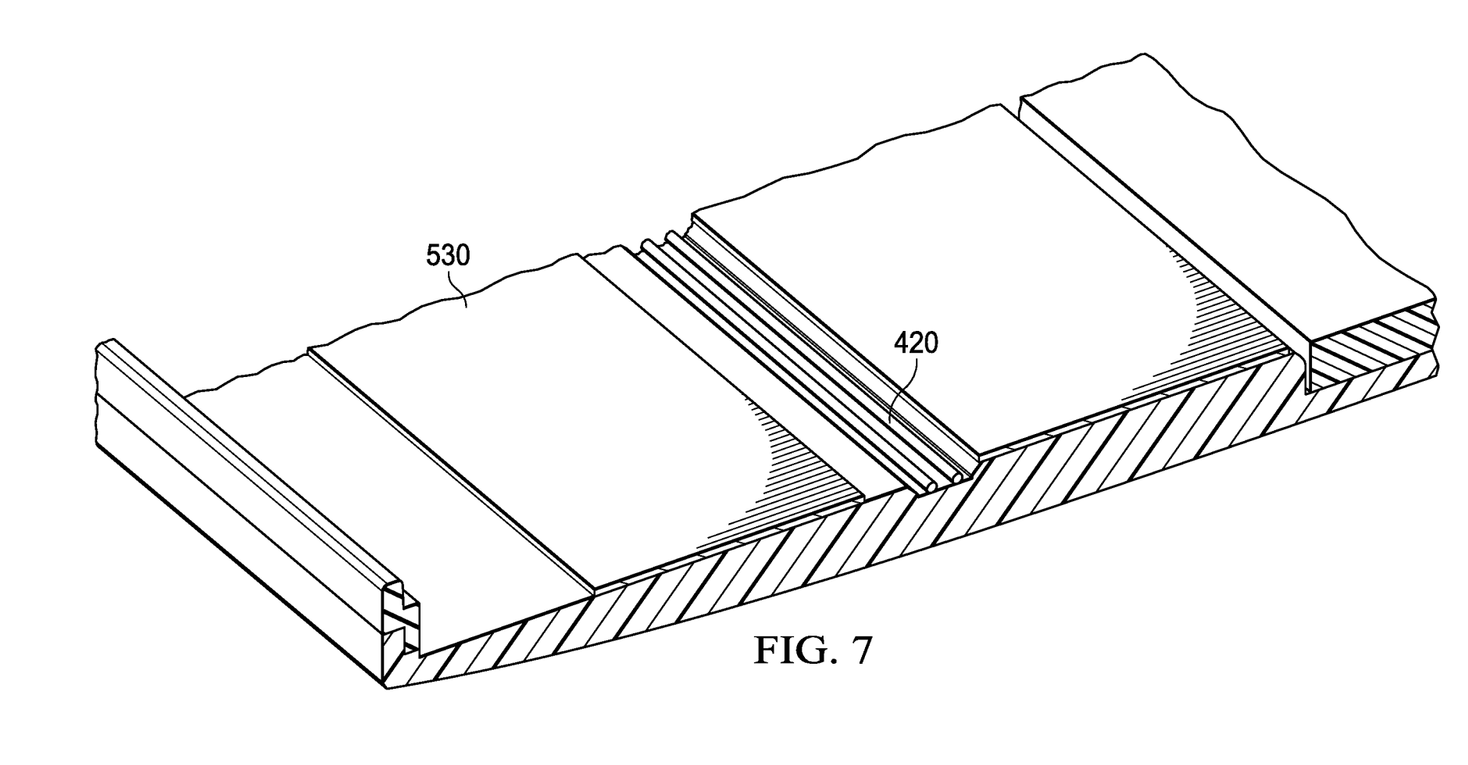
FIG. 7 shows a cross sectional perspective view of a portion of a display chassis of a portable information handling system.
Figure 8:
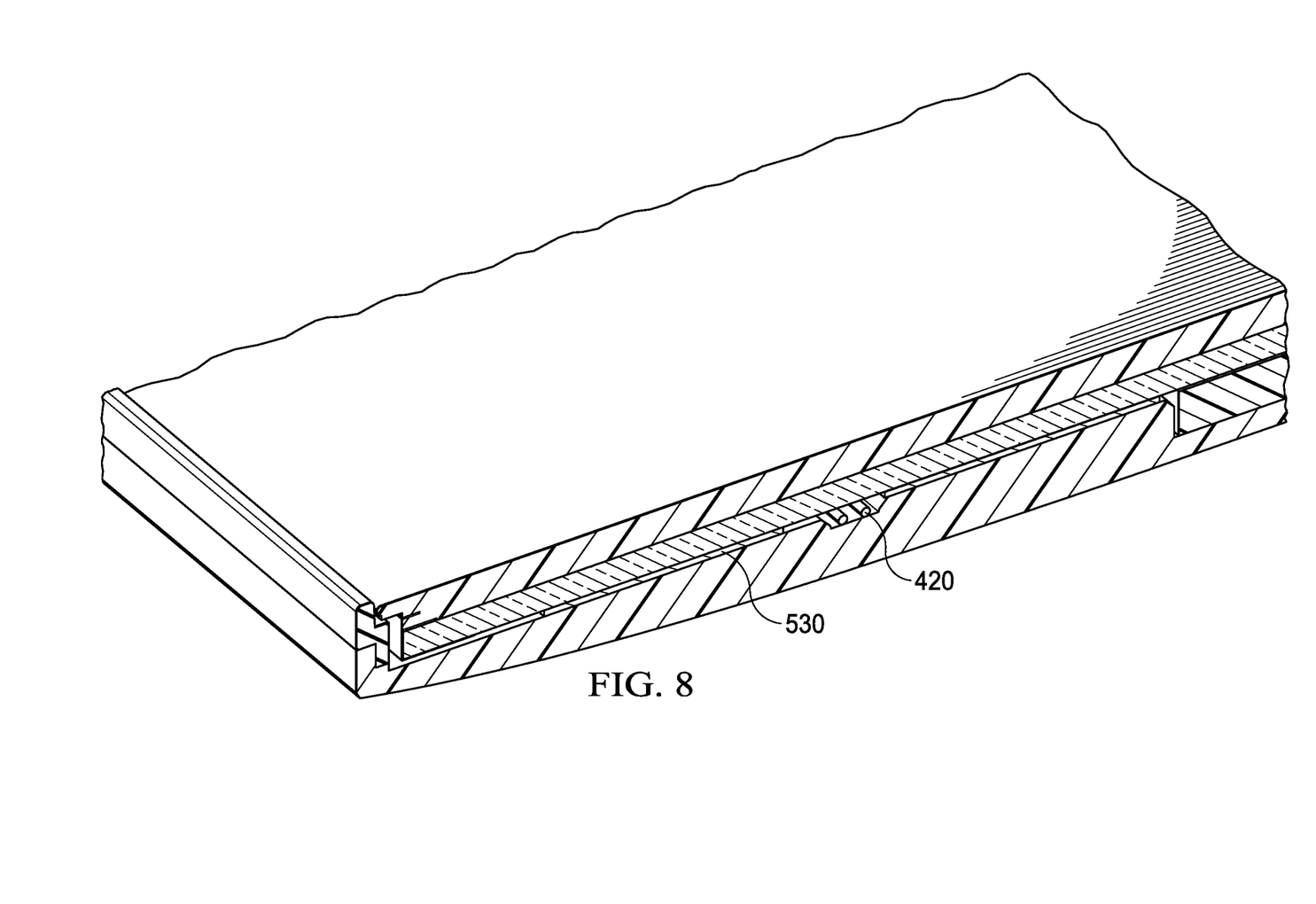
FIG. 8 shows a cross sectional perspective view of a portion of a display chassis of a portable information handling system.

FIG. 4 shows a top view of a display chassis 400 of a portable information handling system. FIG. 5 shows a cutaway top view of a display chassis of a portable information handling system. FIG. 6 shows a cutaway perspective view of a portion of a display chassis of a portable information handling system. FIG. 7 shows a cross sectional perspective view of a portion of a display chassis of a portable information handling system. FIG. 8 shows a cross sectional perspective view of a portion of a display chassis of a portable information handling system. More specifically, FIG. 7 shows a cross sectional perspective view of a display chassis without a display component present. FIG. 8 shows a cross sectional perspective view of a display chassis with a display component. In certain embodiments, the display component comprises a liquid crystal display (LCD) module.

In FIG. 4, the display chassis 400 is shown with a removable cable cover removed but with the remainder of rear display cover of the display chassis in place. When the removable cable cover is removed, a user may access an edge of a display chassis disassembly component 410, an edge of a display chassis disassembly component 412, an end of a display chassis disassembly component 420 and an end of a display chassis disassembly component 422. In certain embodiments, display chassis disassembly component 410 comprises a pull tab 430 and the display chassis disassembly component 412 comprises a pull tab 432. In certain embodiments, display chassis disassembly component 420 comprises an end of a flexible cord 440. In certain embodiments, display chassis disassembly component 420 comprises an end of a flexible cord 442. In certain embodiments, the pull tab 430 and pull tab 432 are accessible when the removable cable cover is removed from the display chassis. In certain embodiments, the end of the flexible cord 440 and the end of flexible cord 442 are accessible when the removable cover is removed from the display chassis.

In certain embodiments, the display chassis disassembly component 410 is coupled with an adhesive component 510. In certain embodiments, the display chassis disassembly component 412 is coupled with an adhesive component 512. In certain embodiments, the display chassis disassembly component 420 is coupled with an adhesive component 520. In certain embodiments, the display chassis disassembly component 422 is coupled with an adhesive component 522. In certain embodiments, adhesive components 510, 512, 520, and 522 comprise a bond and detach tape. In certain embodiments, the adhesive components 510, 512, 520, and 522 comprise permanent adhesive on one side and a releasable adhesive on the other side. In certain embodiments, the releasable adhesive is released by actuating (e.g., stretching) the adhesive component. In certain embodiments, the adhesive components are available for Tesa Corporation under the trade designation tesa 70626 or the equivalent. In certain embodiments, the flexible cord has a diameter of 0.37 mm (+/−10%). In certain embodiments, the flexible cord provides a "fishing line" function in which the cord may be used to release the adhesive component to which the cord is attached. In certain embodiments, the flexible cord is used to pull the adhesive component in a sideways direction (see e.g., arrows 536, 538). In certain embodiments, the flexible cord is a single cord which is wrapped back towards the adhesive component to which the cord is attached so that two ends of the flexible cord are accessible when the removable cable cover is removed.

In certain embodiments, some or all of adhesive components 510, 512, 514 and 516 provide a display component attachment assembly. In certain embodiments, the display component attachment assembly includes some or all of the display chassis disassembly component 410, 412, 420, 422.

In certain embodiments, the rear display cover 500 defines a trough 530 into which the flexible cord 440 fits when the display chassis is assembled (see e.g., FIGS. 6, 7 and 8). In certain embodiments, the rear display cover 500 defines a trough 532 into which the flexible cord 442 fits when the display chassis is assembled.

In certain embodiments, the rear display cover 500 includes a plurality of display component mounting protrusions 540, 542, 544. In certain embodiments, a display component is mounted to the plurality of display component mounting protrusions 540, 542, 544 and then pivoted about the mounting protrusions to press the display component against the adhesive components attached to the rear display cover 500. In certain embodiments, the plurality of display component mounting protrusions 540, 542, 544 are positioned centrally along the bottom edge 550 of the rear display cover so as to not interfere with actuation of the display chassis disassembly components. In certain embodiments, edges of any portions (e.g., display cover portions 610, 612, 614, 616, 618 and 620) that are outside of the central area of the bottom edge 550 of the rear display cover (i.e., are between a disassembly component and an outside edge of the rear display cover) are curved so as to not interfere with actuation of the display chassis disassembly components.

Figures 9, 10:
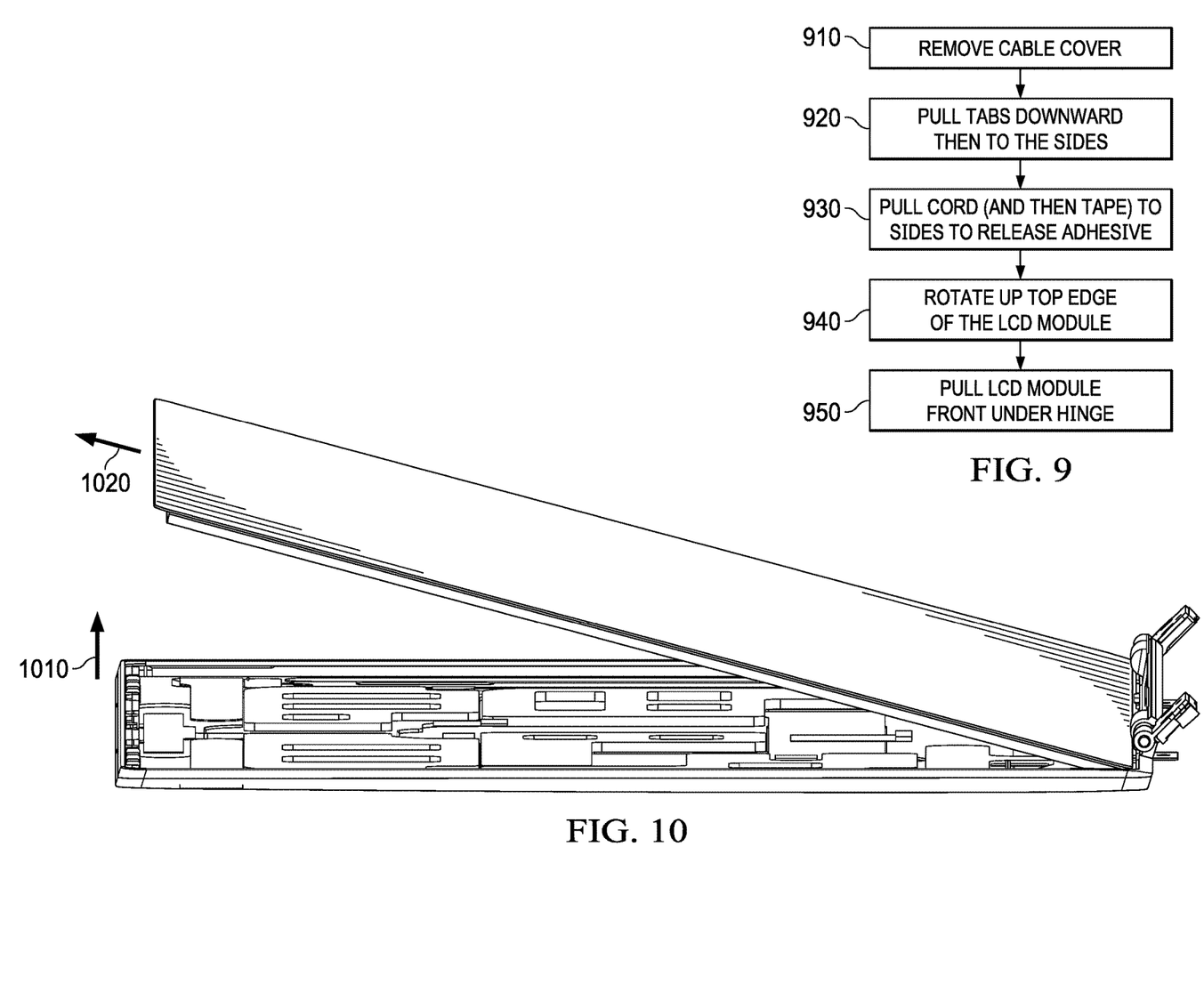
FIG. 9 shows a flow chart of a disassembly process of a display chassis of a portable information handling system.
FIG. 10 shows a diagrammatic representation of a process of disassembling a display chassis of a portable information handling system.

FIG. 9 shows a flow chart of a disassembly process of a display chassis of a portable information handling system. FIG. 10 shows a diagrammatic representation of a process of disassembling a display chassis of a portable information handling system. More specifically, the disassembly process is started at step 9010 by removing the cable cover from the rear display cover. Next at step 9020, the disassembly components 410 and 412 are actuated to release the adhesive components to which they are respectively attached. In certain embodiments the disassembly components 410 and 412 are actuated by pulling the pull tabs 430, 432 downward and then to their respective sides. Next at step 9030, the disassembly components 420 and 422 are actuated to release the adhesive components to which they are respectively attached. In certain embodiments, the disassembly components the disassembly components 420 and 422 are actuated by feeding the cords across the bottom edge of the display cover chassis, across the side edge of the display cover chassis until they reach the adhesive component to which they are attached and then pulling the cords to the side of the display chassis. Next at step 940, a top edge of the display component is rotated away from the rear display cover (see e.g., arrow 1010). Next at step 950, the display component is removed from under the hinge assembly of the display chassis. In certain embodiments, the display component is removed by pulling it in the direction indicated by arrow 1020. It will be appreciated that the disassembly process is essentially the reverse of the display component assembly process where the display component is first inserted under the hinge assembly and is then pressed downward to cause the display component to adhere to the adhesive that is on the rear display cover.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A portable information handing system, comprising:
a base chassis portion, the base chassis portion comprising a motherboard; and,
a display chassis portion, the display chassis portion comprising a display component and a rear display cover portion, the rear display cover portion comprising a display component attachment assembly, the display component attachment assembly attaching the display component to the rear display cover portion, the display component attachment assembly comprising a display chassis disassembly component, the display chassis disassembly component being actuatable to remove the display component from the display chassis portion; and wherein
the display component attachment assembly comprises a bond and detach tape;
the display chassis disassembly component comprises a flexible cord attached to the bond and detach tape; and,
actuating the flexible cord causes the bond and detach tape to release adhesion.

2. The portable information handing system of claim 1, wherein:
the display chassis disassembly component comprises a pull tab attached to the bond and detach tape; and,
actuating the pull tab causes the bond and detach tape to release adhesion.

3. The portable information handing system of claim 1, wherein:
the display chassis portion comprises a removable cable cover; and,
the display chassis disassembly component is accessed by removing the removable cable cover from the display chassis portion.

4. The portable information handing system of claim 1, wherein:
the display component attachment assembly is located along one of a side edge of the rear display cover portion and a top edge of the rear display cover; and,
the display chassis disassembly component is located along a bottom edge of the rear display cover portion.

5. An information handling system comprising:
a base chassis, the base chassis comprising a motherboard, the motherboard comprising a processor and a bus coupled to the processor; and,
a display chassis, the display chassis comprising a display component and a rear display cover portion, the rear display cover portion comprising a display component attachment assembly, the display component attachment assembly attaching the display component to the rear display cover portion, the display component attachment assembly comprising a display chassis disassembly component, the display chassis disassembly component being actuatable to remove the display component from the display chassis; and wherein
the display component attachment assembly comprises a bond and detach tape;
the display chassis disassembly component comprises a flexible cord attached to the bond and detach tape; and,
actuating the flexible cord causes the bond and detach tape to release adhesion.

6. The information handling system of claim 5, wherein:
the display chassis disassembly component comprises a pull tab attached to the bond and detach tape; and,
actuating the pull tab causes the bond and detach tape to release adhesion.

7. The information handling system of claim 5, wherein:
the display chassis comprises a removable cable cover; and,
the display chassis disassembly component is accessed by removing the removable cable cover from the display chassis.

8. The information handling system of claim 1, wherein:
the display component attachment assembly is located along one of a side edge of the rear display cover portion and a top edge of the rear display cover; and,
the display chassis disassembly component is located along a bottom edge of the rear display cover portion.

9. A method for disassembling a display chassis, comprising:
  removing a cable cover to provide access to a disassembly component;
  actuating the disassembly component, a display component being attached to the rear display cover via an attachment assembly, actuation of the disassembly component releasing adhesion of the display component to a rear display cover; and,
  removing the display component from the display chassis by pulling the display component away from a hinge assembly of the display chassis; and wherein
  the display component attachment assembly comprises a bond and detach tape;
  the display chassis disassembly component comprises a flexible cord attached to the bond and detach tape; and,
  actuating the flexible cord causes the bond and detach tape to release adhesion.

10. The method of claim 9, wherein:
  the display chassis disassembly component comprises a pull tab attached to the bond and detach tape; and,
  actuating the pull tab causes the bond and detach tape to release adhesion.

11. The method of claim 9, wherein:
  the display chassis comprises a removable cable cover; and,
  the display chassis disassembly component is accessed by removing the removable cable cover from the display chassis.

12. The method of claim 9, wherein:
  the display component attachment assembly is located along one of a side edge of the rear display cover portion and a top edge of the rear display cover; and,
  the display chassis disassembly component is located along a bottom edge of the rear display cover portion.

* * * * *